United States Patent
Stoia et al.

(10) Patent No.: US 10,564,031 B1
(45) Date of Patent: Feb. 18, 2020

(54) METHODS AND SYSTEMS FOR DETERMINING ERRORS BASED ON DETECTED SOUNDS DURING OPERATION OF A ROBOTIC DEVICE

(71) Applicant: X Development LLC, Mountain View, CA (US)

(72) Inventors: Laura Stoia, Mountain View, CA (US); Craig Latimer, Palo Alto, CA (US); Matthieu Guilbert, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 599 days.

(21) Appl. No.: 14/833,792

(22) Filed: Aug. 24, 2015

(51) Int. Cl.
*G01H 3/08* (2006.01)
*B25J 9/16* (2006.01)
*G01M 13/00* (2019.01)

(52) U.S. Cl.
CPC .............. *G01H 3/08* (2013.01); *B25J 9/1674* (2013.01); *G01M 13/00* (2013.01)

(58) Field of Classification Search
None
See application file for complete search history.

(56) References Cited

U.S. PATENT DOCUMENTS

| | | | |
|---|---|---|---|
| 6,026,686 A | 2/2000 | Hattori et al. | |
| 7,277,247 B2 | 10/2007 | Hoshino | |
| 7,324,909 B2 | 1/2008 | Yasukawa et al. | |
| 7,647,827 B2 | 1/2010 | Pelecanos et al. | |
| 7,882,394 B2 * | 2/2011 | Hosek | G05B 23/0235 702/184 |
| 8,074,499 B2 | 12/2011 | Kinzie et al. | |
| 8,544,331 B2 * | 10/2013 | Liang | G01N 29/14 73/659 |
| 8,791,714 B2 | 7/2014 | Hansen | |
| 8,799,258 B2 | 8/2014 | Mule | |
| 8,918,343 B2 | 12/2014 | Mitchell | |
| 9,211,643 B1 * | 12/2015 | Shirakyan | B25J 9/1697 |

(Continued)

FOREIGN PATENT DOCUMENTS

KR 20120116313 A 10/2012

OTHER PUBLICATIONS

Agoston, Fault Detection of the Electrical Motors Based on Vibration Analysis, Procedia Technology, Apr. 19, 2015, pp. 547-553.*

*Primary Examiner* — Lina M Cordero
(74) *Attorney, Agent, or Firm* — McDonnell Boehnen Hulbert & Berghoff LLP

(57) ABSTRACT

An example method includes determining a plurality of frequency ranges corresponding to a plurality of types of errors, where the plurality of frequency ranges are associated with sounds occurring during operation of a robotic device. The method also includes detecting, based on sensor data from at least one audio sensor of the robotic device, a sound during a given operation of the robotic device. The method also includes determining that a frequency of the detected sound is within a particular frequency range of the plurality of frequency ranges. Based on the frequency being within the particular frequency range, the method also includes determining a type of error of the plurality of types of errors corresponding to the particular frequency range. The method also includes providing an output signal indicating an error of the determined type.

20 Claims, 7 Drawing Sheets

(56) References Cited

U.S. PATENT DOCUMENTS

| | | | |
|---|---|---|---|
| 9,734,448 B2* | 8/2017 | Bolich | G06N 5/02 |
| 9,797,941 B2* | 10/2017 | Kolker | G01R 31/025 |
| 9,999,954 B2* | 6/2018 | Okamoto | B23Q 17/2241 |
| 2002/0184755 A1 | 12/2002 | Suhara | |
| 2004/0024490 A1* | 2/2004 | McLurkin | G05D 1/0297 |
| | | | 700/245 |
| 2004/0030419 A1* | 2/2004 | Miyasaka | G01H 1/00 |
| | | | 700/32 |
| 2004/0233607 A1* | 11/2004 | Aihara | B25J 9/1674 |
| | | | 361/160 |
| 2005/0036036 A1 | 2/2005 | Stevenson et al. | |
| 2005/0077847 A1* | 4/2005 | Watanabe | B25J 9/1674 |
| | | | 318/34 |
| 2006/0061316 A1* | 3/2006 | Aihara | B25J 9/1602 |
| | | | 318/568.12 |
| 2006/0079997 A1* | 4/2006 | McLurkin | G05D 1/0297 |
| | | | 700/245 |
| 2007/0206456 A1* | 9/2007 | Sullivan | G05B 19/19 |
| | | | 369/44.29 |
| 2008/0002832 A1 | 1/2008 | Chen et al. | |
| 2009/0143913 A1* | 6/2009 | Kim | B25J 9/1674 |
| | | | 700/259 |
| 2009/0153144 A1* | 6/2009 | Hansen | G05B 23/0229 |
| | | | 324/511 |
| 2012/0123737 A1 | 5/2012 | Hansen | |
| 2013/0079928 A1* | 3/2013 | Soe-Knudsen | B25J 9/1656 |
| | | | 700/248 |
| 2013/0231779 A1* | 9/2013 | Purkayastha | B25J 9/1697 |
| | | | 700/259 |
| 2014/0201571 A1* | 7/2014 | Hosek | G06F 11/2257 |
| | | | 714/26 |
| 2015/0012209 A1* | 1/2015 | Park | G01C 21/20 |
| | | | 701/408 |
| 2015/0105908 A1* | 4/2015 | Ivanov | B25J 9/1697 |
| | | | 700/259 |
| 2015/0266183 A1* | 9/2015 | Alifragkis | B25J 9/1692 |
| | | | 700/254 |
| 2015/0279181 A1* | 10/2015 | Park | G08B 13/1672 |
| | | | 367/136 |

* cited by examiner

METHODS AND SYSTEMS FOR DETERMINING ERRORS BASED ON DETECTED SOUNDS DURING OPERATION OF A ROBOTIC DEVICE

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems that can operate alongside and interface with humans becomes apparent. Therefore, a demand for such robotic systems has helped open up a field of innovation in actuators, sensing techniques, controllers, as well as component design and assembly.

SUMMARY

In one example, a method is provided that includes determining a plurality of frequency ranges corresponding to a plurality of types of errors, where the plurality of frequency ranges are associated with sounds occurring during operation of a robotic device. The method also includes detecting, based on sensor data from at least one audio sensor associated with the robotic device, a sound during a given operation of the robotic device. The method also includes determining that a frequency of the detected sound is within a particular frequency range of the plurality of frequency ranges. Based on the frequency being within the particular frequency range, the method also includes determining a type of error of the plurality of types of errors corresponding to the particular frequency range. The method also includes providing an output signal indicating an error of the determined type.

In another example, a method is provided that includes determining, for a robotic device, a first frequency range corresponding to mechanical errors, a second frequency range corresponding to software errors, and a third frequency range corresponding to electrical errors. The method also includes detecting, based on sensor data from at least one audio sensor associated with a robotic device, a sound during an operation of the robotic device. The method also includes determining that a frequency range of the detected sound corresponds to the first frequency range, the second frequency range, or the third frequency range. Based on the corresponding frequency range, the method also includes determining a type of error, wherein the type of error is selected from the mechanical errors, the software errors, and the electrical errors. The method also includes providing an output signal indicating the type of error.

In another example, a robotic device is provided that includes one or more audio sensors, where the one or more audio sensors are configured for detecting a sound associated with operation of the robotic device. The robotic device also includes one or more processors and data storage comprising instructions executable by the one or more processors to cause the robotic device to perform operations. The operations include determining a first frequency range corresponding to mechanical errors, a second frequency range corresponding to software errors, and a third frequency range corresponding to electrical errors. The operations also include detecting, based on sensor data from the one or more audio sensors, a sound during a given operation of the robotic device. The operations also include determining that a frequency of the detected sound is within a particular frequency range of the first frequency range, the second frequency range, and the third frequency range. The operations also include determining a type of error associated with the particular frequency range. The operations also include determining one or more operational metrics associated with the robotic device when the sound was detected. The operations also include providing an output signal indicating the type of error and the one or more operational metrics.

In another example, a system is provided that includes a means for determining a plurality of frequency ranges corresponding to a plurality of types of errors, where the plurality of frequency ranges are associated with sounds occurring during operation of a robotic device. The system also includes means for detecting, based on sensor data from at least one audio sensor associated with the robotic device, a sound during a given operation of the robotic device. The system also includes means for determining that a frequency of the detected sound is within a particular frequency range of the plurality of frequency ranges. Based on the frequency being within the particular frequency range, the system also includes means for determining a type of error of the plurality of types of errors corresponding to the particular frequency range. The system also includes means for providing an output signal indicating an error of the determined type.

In another example, a system includes means for determining, for a robotic device, a first frequency range corresponding to mechanical errors, a second frequency range corresponding to software errors, and a third frequency range corresponding to electrical errors. The system also includes means for detecting, based on sensor data from at least one audio sensor associated with a robotic device, a sound during an operation of the robotic device. The system also includes means for determining that a frequency range of the detected sound corresponds to the first frequency range, the second frequency range, or the third frequency range. Based on the corresponding frequency range, the system also includes means for determining a type of error, wherein the type of error is selected from the mechanical errors, the software errors, and the electrical errors. The system also includes means for providing an output signal indicating the type of error.

These as well as other aspects, advantages, and alternatives, will become apparent to those of ordinary skill in the art by reading the following detailed description, with reference where appropriate to the accompanying figures.

DETAILED DESCRIPTION

Figure 1:
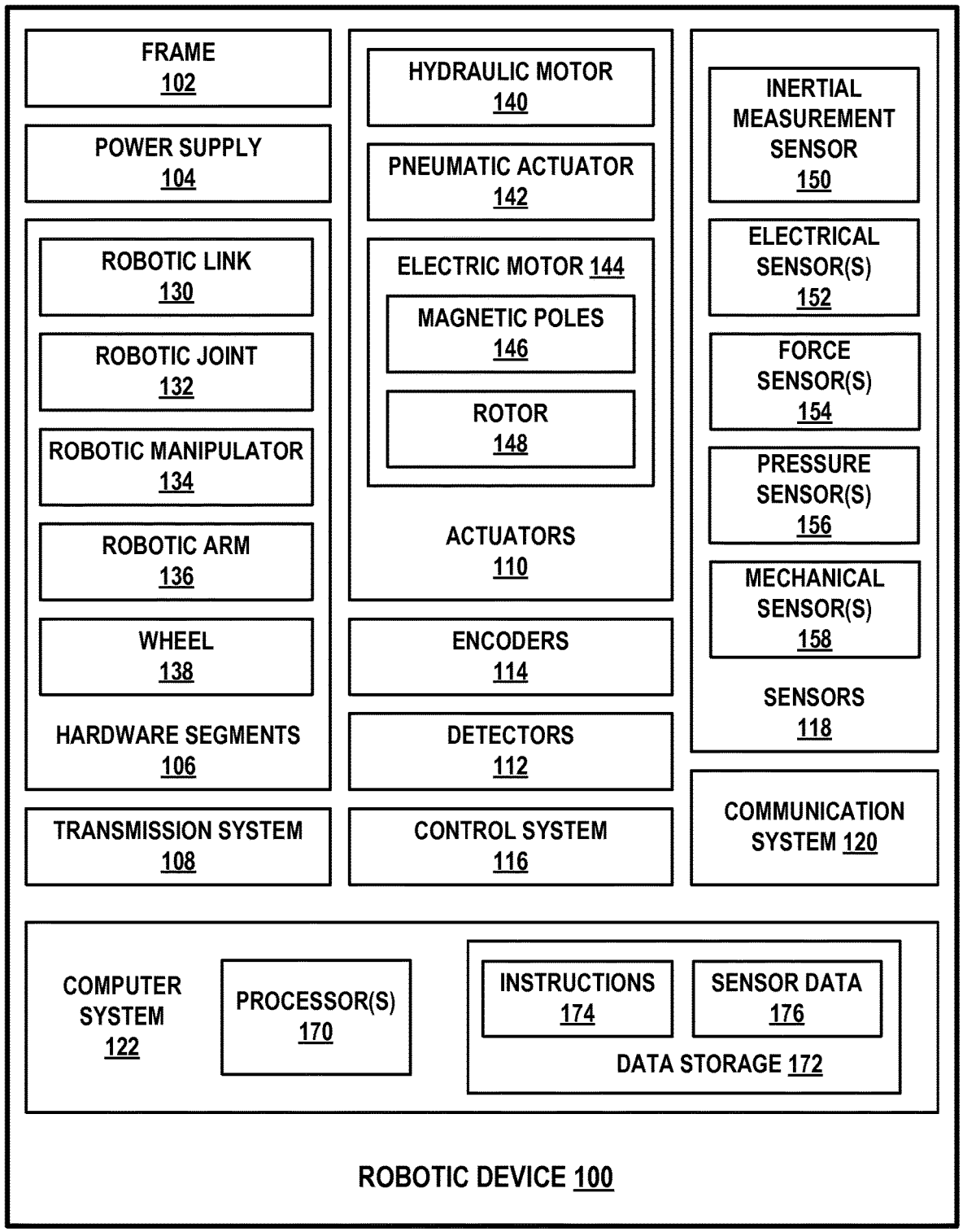
FIG. 1 is a block diagram of a robotic device, according to an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

As indicated above, the use of robotic devices continues to increase through various applications. For instance, a robotic device may be instructed to perform a given operation in a continuous manner that allows a manufacturing facility to continue production with a reduced labor force. Based on changes in manufacturing, it may be desirable to periodically update the functionality associated with the robotic device in order to meet production demands. In some examples, updating the functionality may be performed at a different facility associated with the design of the robotic device. In further examples, a number of individuals may work together to develop software associated with the new functionality of the robotic device through the use of continuous integration testing.

As the software is developed, testing may be required to ensure that numerous modules of the software are compatible with each other. In one example, the testing may involve operating the robotic device according to the most recent version of the software. In one scenario, the robotic device may be instructed to perform an operation involving the assembly of a vehicle door. In this scenario, the robotic device may be configured to move the vehicle door to a predetermined location in order to assist with the production of vehicles.

While the robotic device is performing the operation associated with the vehicle door, a microphone attached to the robotic device may listen for unexpected sounds during the operation. The microphone may be instructed to listen for certain frequencies that correspond to one or more errors in robot operation. In another example, a microphone may be placed in the vicinity of the robotic device and be configured to listen for unexpected sounds during the operation.

Error identification may be beneficial to the individuals responsible for the development of the software associated with the new functionality of the robotic device. Knowledge that different systems of the robotic device may be associated with different ranges of frequencies may be leveraged to help troubleshoot multiple error types of the robotic device such as mechanical errors, software errors, and electrical errors. For example, the microphone may detect a sound with an associated frequency of 7 Hz during the operation. In this example, the frequency range of the detected sound may fall within a frequency range of mechanical errors.

The type of error associated with the sound may help to identify a particular cause of the error. For instance, specific control data associated with the operation of the robotic device may be analyzed in view of the mechanical error. In one example, the current associated with a motor driving a belt transmission of the robotic device may be analyzed to determine if a particular belt of the belt transmission is causing an error during the operation. Other examples associated with software errors or electrical errors are possible as well. Example systems and methods provide a way to facilitate identification of various error types associated with operation of a robotic device.

Within examples, one or more computing devices may be provided that are configured to determine a plurality of frequency ranges corresponding to a plurality of types of errors, wherein the plurality of frequency ranges are associated with sounds occurring during operation of a robotic device. In one example, the plurality of frequency ranges may correspond to mechanical errors, software errors, and electrical errors. By way of example, the mechanical errors may be associated with actuation of components of the robotic device. In another example, the software errors may correspond to control of the robotic device such as position control. In another example, the electrical errors may correspond to a failure associated with one or more components of a circuit of the robotic device.

In some scenarios, the one or more computing devices may also be configured to detect, based on sensor data from at least one audio sensor associated with the robotic device, a sound during a given operation of the robotic device. By way of example, a sound may occur due to an error associated with one or more commands of the robotic device. For instance, a command associated with position control of the robotic device may include a value that is greater than what is required for the robotic device to perform a given operation and thereby cause a jerk in movement and an unexpected sound during the given operation. In this instance, the robotic device may still complete the given operation despite the error associated with movement. For example, the error associated with the command may only last for one cycle (e.g., 500 microseconds), and the resulting deviation in movement may therefore not be noticeable visually or by analyzing a position error derived from an encoder. However, the error associated with the command may produce a sound that is detected by an audio sensor.

In another scenario, the one or more computing devices may also be configured to determine that a frequency of the detected sound is within a particular frequency range of the plurality of frequency ranges. Based on the frequency being within the particular frequency range, the one or more computing devices may be configured to determine a type of error of the plurality of types of errors corresponding to the particular frequency range. As an illustrative example, if the frequency of the detected sound is 25 kHz, the one or more computing devices may determine that the error is an electrical error based on a determined frequency range of electrical errors of 20 kHz to 50 kHz. Other values may be determined for the frequency range of electrical errors as well, depending on the hardware of a particular robot.

Further, the one or more computing devices may be configured to provide an output signal indicating an error of the determined type. The output signal may also comprise additional data that could be useful in determining what may be causing the error. For instance, operational data of the robotic device such torque, velocity, current, and voltage associated with the given operation may be included in the output signal. By way of example, the operational data may be timestamped according to when the sound was detected. Timestamping both the occurrence of a sound and the operational data associated with the sound may allow for correlation of operational data with detected sounds in a quick and efficient manner. In another instance, a determined application state associated with the determined error may be provided with the output signal. The determined application state may be useful to understand what instructions occurred before the detected sound.

Referring now to the Figures, FIG. 1 is a simplified block diagram of a robotic device 100, according to an example embodiment. As shown, the robotic device 100 includes a frame 102, a power supply 104, hardware segments 106, a transmission system 108, actuators 110, detectors 112, encoders 114, a control system 116, sensors 118, a communication system 120, and a computer system 122. In other embodiments, the robotic device 100 may include more, fewer, or different components, and each component may include more, fewer, or different sub-components. In addition, the robotic device 100 may be configured to operate autonomously, semi-autonomously, and/or using instructions provided user(s), and may exist in various forms, such as a humanoid robot or a quadruped robot, among other examples. The robotic device 100 may be fixed within the environment, or may have one of a number of different types of mobile bases (e.g., different numbers of wheels). Furthermore, the robotic device 100 may also be referred to as a robotic device, mobile robot, or robot, among others. Additionally, the components and sub-components shown may be combined or divided in any number of ways.

The frame 102 may be configured to support the various components of the robotic device 100. For example, the frame 102 may include aluminum, titanium, other metal/metal-alloy, plastic, composite, wood, or any other solid material having shape and material characteristics to support the components of the robotic device 100.

The power supply 104 may be configured to provide power to some or all of the components of the robotic device 100. To this end, the power supply 104 may include, for example, a rechargeable lithium-ion or lead-acid battery. In some embodiments, one or more banks of batteries may be configured to provide electrical power. Other power supply materials and configurations are possible as well, such as non-rechargeable batteries, etc. For example, the power supply 104 may include a source of energy that powers some or all the components of the robotic device 100. Example sources of energy may include gasoline, diesel, propane, other compressed gas-based fuels, ethanol, solar panels, batteries, or any other sources of energy. Further, for example, the power supply 104 may include wired (e.g., power cable, usb cable, etc.) and/or wireless connectivity (e.g., energy-harvesting antenna, etc.) with an external source (e.g., wall outlet, other power outlet, radiating antenna, etc.) to receive the energy and provide the power to the various components of the robotic device 100. Additionally or alternatively, the power supply 104 may include a combination of fuel tanks, batteries, capacitors, flywheels, etc.

The plurality of moveable hardware segments 106 may include any combination of physical components that are actuated by the robotic device 100 to interact with an environment of the robotic device 100. As shown, the hardware segments 106 include a robotic link 130, a robotic joint 132, a robotic manipulator 134, a robotic arm 136, and a wheel 138. However, in some embodiments, the hardware segments 106 may include a different combination of segments. For instance, the hardware segments 106 may alternatively include three links, four joints, one manipulator, and no wheels. Other combinations are possible as well.

The link 130 may be a rigid component of the robotic device 100 that has a particular shape. As such, the link 130 may include aluminum, titanium, other metal/metal-alloy, plastic, composite, wood, or any other solid material.

The joint 132 is a component of the robotic device 100 that allows a rotational and/or translational degree of freedom to the link 130. For instance, the joint 132 may be a round rotating structure connected to the link 130 to allow the link 130 to rotate about an axis of the joint 132.

The manipulator 134 may be a machine or robotic mechanism that allows the robotic device 100 to interact with various objects in the environment of the robotic device 100. For example, the manipulator 134 may include a series of segments such as the link 130 and the joint 132 that are configured to grasp and/or move objects in the environment of the robotic device 100, usually in several degrees of freedom. Alternatively, for example, the manipulator 134 may include an end-effector tool, such as a robotic wrist or a magnet, that is configured to manipulate the objects in the environment.

The arm 136 may include an interconnected set of links, joints and/or manipulators, such as the link 130, the joint 132, and/or the manipulator 134, to support or move an object through space.

The wheel 138 may include any type of wheel, such as a single wheel, double wheel, compound wheel, castor wheel, or any other wheel configured to rotate to move the robotic device 100 along a heading (e.g., steering direction) of the wheel 38. The wheel 138 may include one or more solid materials suitable for performing the function of the wheel 138 such as plastic, composite, metal, metal compound, etc. By way of example, a castor wheel may be configured to roll along a straight line path, or mounted on a pivot (e.g., swivel, etc.) such that the wheel 138 may align with a direction of travel. Additionally, in some examples, the wheel 138 may include an energy-absorbing material (e.g., rubber, etc.) to facilitate operation and/or maintenance of the wheel 138. For example, the wheel 138 may include a tire coupled to a rim of the wheel 138.

The transmission system 108 may be coupled to at least one of the hardware segments 106. In some examples, the transmission system 108 may include transmission components such as clutches, differentials, pulleys, cables, belts, drive shafts, and/or other elements. Additionally, transmission system 108 may be configured to change speed, torque, and direction of rotation of the hardware segments 106 relative to the actuators 110. Other examples are possible as well.

The plurality of actuators 110 may be configured to actuate the hardware segments 106 and/or to maintain positions of the hardware segments 106. As such, the actuators 110 may include any combination of actuators such as an electric motor, a steam motor, a sterling motor, a combustion motor, a hydraulic motor, a pneumatic motor, or any other actuator. In some examples, a given actuator may include multiple types of motors. For example, a gas-electric hybrid device may include a gasoline engine and an electric engine that are intermittently activated as the given actuator. Other examples are possible as well. As shown, the actuators 110 include a hydraulic motor 140, a pneumatic actuator 142, and an electric motor 144. However, in some embodiments, the actuators 110 may include a different number or combination of motors. For instance, the actuators 110 may alternatively include five electric motors only. Other combinations are possible as well.

The hydraulic motor 140 may include any mechanical actuator that converts hydraulic pressure and flow into torque and angular displacement (e.g., rotation). Example hydraulic motors include gear and vane motors, gerotor motors, axial plunger motors, radial piston motors, etc.

The pneumatic actuator 142 may include any actuator that converts energy in the form of a compressed fluid into mechanical motion. The mechanical motion may be rotary and/or linear, depending on the type of the pneumatic actuator 142. Example pneumatic actuators include tie rod cylinders, rotary pneumatic actuators, grippers, rodless pneumatic actuators, pneumatic artificial muscles, specialty actuators that combine rotary and linear motion, vacuum generators, etc.

The electric motor 144 may include any actuator that converts electrical energy into mechanical motion. For instance, the electric motor 144 may receive an electric current (e.g., AC current, DC current, etc.) from the power supply 104 and responsively provide the mechanical motion. To facilitate the energy conversion, an electric motor may operate according to various physical principles such as magnetic, electrostatic, piezoelectric, etc. As shown, the electrical motor 144 is of the magnetic variety. As such, the electric motor 144 includes a plurality of magnetic poles 146 arranged around a rotor 148. The magnetic poles 146, for example, may be formed as coils that are electronically switched by the robotic device 100. In turn, the rotor 148 may include a magnet or other material that is attracted/repelled towards one or more of the magnetic poles 146. The resulting motion of the rotor 148 may correspond to the mechanical motion that is caused by the electrical energy received by the magnetic poles 146. Other arrangements for the electric motor 144 are possible as well such as coreless motors, axial rotor motors, servo motors, stepper motors, linear motors, etc.

The detector(s) 112 may be configured to receive possible states of operation of the robotic device 100 and provide information indicative of the possible states of operation to one or more processors 170. In one example, the one or more processors 170 may be configured to receive information about an expected state of operation of the robotic device 100 and based on the received information, the one or more processors 170 may determine that the possible states of operation differ from the expected state of operation of the robotic device 100. In this example, based on a possible state of operation, the robotic device 100 may be instructed to begin powering down.

The encoders 114 may be coupled to the actuators 110 and configured to provide data indicative of motion and/or orientation of the actuators 110. For example, the encoders 114 may include a rotary encoder, a shaft encoder, or any other electro-mechanical device configured to convert an angular position/motion of a shaft of a given actuator to an analog or digital signal (e.g., the data, etc.). Various implementations are possible for the encoders 114 such as mechanical (e.g., metal disc containing a set of concentric rings of openings), optical (e.g., glass/plastic with transparent and opaque areas), magnetic (e.g., disc that includes a series of magnetic poles), capacitive (e.g., asymmetrical shaped disc rotated within the encoder to adjust capacitance between two electrodes), or any other implementation.

In some examples, the data provided by the encoders 114 may indicate a change in a position (e.g., orientation) of a given actuator of the actuators 110. Further, for example, the encoders 114 may provide a signal (e.g., index pulse, etc.) indicative of the given actuator being at a particular orientation. Further, in some examples, the data provided by the encoders 114 may be processed by the robotic device 100 to determine speeds of the actuators 110. For example, a time measurement may be obtained by the robotic device 100 in addition to the data from the encoders 114 to determine the speeds of the actuators 110.

Accordingly, in some examples, the encoders 114 may include an incremental encoder configured to provide the data indicative of motion of the actuators 110. In these examples, the robotic device 100 may cause actuators 110 to actuate one or more of the hardware segments 106, until the signal (e.g., index pulse, etc.) of the encoders 114 is detected to determine the particular orientations of the actuators 110.

Additionally or alternatively, in some examples, the encoders 114 may include an absolute encoder configured to provide the data. The absolute encoder, for example, may be configured to detect motion of the actuators 110 even if the absolute encoder is not provided with power. In these examples, the encoders 114 may provide the data indicative of the orientations of the actuators 110 without the robotic device 100 actuating the hardware segments 106 until the signal (e.g., index pulse) is received from the encoders 114.

The control system 116 may be configured to control operation of the robotic device 100 and/or components thereof. For instance, the control system 116 may include any combination of mechanisms configured to control the hardware segments 106. For example, the robotic device 100 may be an assembly line robot, and the control system 116 may control the robotic arm 136 to move an object from one location to another.

In some examples, the control system 116 may be implemented as a control loop that receives inputs from the detectors 112 and encoders 114 and provides output signals to control power provided to the actuators 110 to achieve a particular speed of motion of the hardware segments 106. Example control loops may include open loops, closed loops, etc. For example, the control system 116 may be implemented as proportional-integral-derivative (PID) controller. Other examples are possible as well. Thus, for example, the control system 116 may be configured to measure and/or control electric signals in the actuators 110. The control system 116 may additionally or alternatively include components other than those shown in FIG. 1.

The sensor(s) 118 may include a number of sensors configured to sense information about an environment in which the robotic device 100 is located, as well as sensing components in the robotic device 100. Further, in some examples, the sensors 118 may include one or more audio sensors. The one or more audio sensors may be configured for detecting a sound associated with operation of the robotic device 100. As shown, the sensors of the sensor system 204 include an inertial measurement sensor (IMS) 150, one or more electrical sensors 152, one or more force sensors 154, one or more pressure sensors 156, and one or more mechanical sensors 158. The sensors 118 may include additional sensors as well, including, for example, sensors that monitor internal systems of the robotic device 100 (e.g., an $O_2$ monitor, a fuel gauge, a temperature monitor, etc.). Other sensors are possible as well.

The IMS 150 may be any combination of sensors configured to sense position and orientation changes of the robotic device 100 or components thereof based on inertial acceleration. In some embodiments, the combination of sensors may include, for example, accelerometers and gyroscopes. Other combinations of sensors are possible as well.

The electrical sensor(s) 152 may be any sensor configured to determine electrical properties associated with various components of the robotic device 100 (e.g., electric motor 144). For example, the electrical sensor 152 may include a current sensor (e.g., using electric current), a voltage detector (e.g., using voltage), or any other electrical sensor capable of measuring a voltage and/or current.

The force sensor(s) 154 may include any combination of sensors configured to measure force at various parts of the robotic device 100. For example, the force sensors 154 may include a force gauge, spring scale, strain gauge, load cell, load pin, or any other force sensor. The force sensors 154 may be arranged in various parts of the robotic device 100 to measure forces along the robotic device 100, and provide an indication of the forces to the robotic device 100. For example, a strain gauge may be placed between the robotic link 130 and the robotic joint 132 to measure the force between the two components. Further, in some examples, the force sensors 154 may be configured to measure a weight of one or more of the components in the robotic device 100. In one scenario, the robotic device 100 may adjust a position of a given segment to an upright position, and an associated force sensor may thus measure the weight of the given segment.

The pressure sensor(s) 156 may include any combination of sensors configured to measure pressure at various parts of the robotic device 100. For example, the pressure sensors 156 may include absolute pressure sensors, gauge pressure sensors, vacuum pressure sensors, differential pressure sensors, sealed pressure sensors, etc. The pressure sensors 156 may be arranged in various parts of the robotic device 100 to measure various pressures. For example, the pressure sensors 156 may measure pressure of fluid in the hydraulic motor 140, or pressure at an interface between two of the hardware segments 106, among other possibilities.

The mechanical sensor(s) 158 may include any combination of sensors configured to measure mechanical properties associated with the robotic device 100. By way of example, the mechanical sensors 158 may include one or more torque sensors for measuring a torque of the transmission system 108. In one scenario, the mechanical power is determined according to a torque sensor coupled to the transmission system 108 and an encoder 114 associated with a hardware segment of the hardware segments 106 of the robotic device 100.

The communication system 120 may include a wired communication interface (e.g., parallel port, USB, etc.) and/or a wireless communication interface (e.g., antennae, transceivers, etc.) to receive and/or provide signals from/to external devices. In some examples, the communication system 120 may receive instructions for operation of the robotic device 100. Additionally or alternatively, in some examples, the communication system 120 may provide output data such as data from the encoders 114 and/or data from the sensors 118.

The computer system 122 includes one or more processors 170 and data storage 172. In some examples, some components of the computer system 122 may be distributed across multiple computing devices. For example, the data storage 172 may be included in an external data storage device communicatively linked with the robotic device 100. Other examples are possible as well. However, for the sake of example, the components are shown and described as part of the computer system 122.

The computer system 122 may be configured to transmit data to and receive data from one or more of the various components of the robotic device 100. To this end, the computer system 122 may be communicatively linked to one or more of the power supply 104, the actuators 110, the encoders 114, the control system 116, the sensors 118, and/or the communication system 120 by a system bus, network, and/or other connection mechanism (not shown in FIG. 1).

The computer system 122 may be further configured to interact with and control one or more hardware segments 106 of the robotic device 100. For example, the computer system 122 may be configured to provide instructions to the control system 116 to cause the actuators 110 to adjust positions of the hardware segments 106. As another example, the computer system 122 may be configured to provide instructions to the control system 116 to cause the electric motor 144 to no longer receive electrical power based on a given state of operation of the robotic device 100. Other examples are possible as well.

The processor(s) 170 may comprise one or more general-purpose processors and/or one or more special-purpose processors. To the extent the processor 170 includes more than one processor, such processors may work separately or in combination. For example, a first processor of the processor(s) 170 may operate the actuators 110, and a second processor of the processor(s) 170 may operate the sensors 118, etc. The data storage 172, in turn, may comprise one or more volatile and/or one or more non-volatile storage components, such as optical, magnetic, and/or organic storage, and the data storage 172 may be integrated in whole or in part with the processor 170.

In some embodiments, the data storage 172 may contain instructions 174 (e.g., program logic) executable by the processor 170 to perform various functions of the robotic device 100. The data storage 172 may contain additional instructions as well, including instructions to transmit data to, receive data from, interact with, and/or control one or more of the actuators 110, the encoders 114, the control system 116, the sensors 118, the detectors 112, and/or any other component of the robotic device 100. Although not illustrated in FIG. 1, the data storage 172 may store other data such as data collected by the encoders 114, the control system 116, and/or data from the sensors 118, etc. In one example, the data storage 172 may store sensor data 176. The sensor data 176 may be used to determine states of operation of the robotic device 100. The computer system 122 may additionally or alternatively include components other than those shown in FIG. 1.

In one scenario, the data storage 172 may comprise instructions executable by the one or more processors 170 to cause the system to perform operations such as determining a first frequency range corresponding to mechanical errors, a second frequency range corresponding to software errors, and a third frequency range corresponding to electrical errors. The operations may also include detecting, based on sensor data from the one or more audio sensors, a sound during a given operation of the robotic device 100. The operations may also include determining that a frequency of the detected sound is within a particular frequency range of the first frequency range, the second frequency range, and the third frequency range. The operations may also include determining a type of error associated with the particular frequency range. The operations may also include determining one or more operational metrics associated with the robotic device 100 when the sound was detected sound. Further, the one or more processors 170 may be configured for providing an output signal indicating the type of error and the one or more operational metrics. In one instance, the one or more operational metrics may be determined according to a first period of time prior to the detected sound and a second period of time subsequent to the detected sound.

In another scenario, the data storage 172 may further comprise instructions executable by the one or more processors 170 to cause the system to perform operations such as determining that the frequency range is within the first frequency range. In this scenario, the operations may also include determining a duration associated with the detected sound. Further, based on the frequency being within the first frequency range and the determined duration, the operations may include identifying one or more components of the robotic device configured for movement associated with the detected sound. In addition to the output signal indicating the type of error and the one or more operational metrics, the output signal may also indicate the identified one or more components.

By way of example, the data storage 172 may further comprise instructions executable by the one or more processors 170 to cause the system to perform operations such as determining that the frequency range is within the second frequency range. Further, based on the frequency being within the second frequency range, the operations may include determining an application state associated with the detected sound. The application state may comprise one or more values stored in a memory and a location in a sequence of instructions. In addition to the output signal indicating the type of error and the one or more operational metrics, the output signal may also indicate the determined application state.

In another example, the data storage 172 may further comprise instructions executable by the one or more processors 170 to cause the system to perform operations such as determining that the frequency range is within the third frequency range. Further, based on the frequency being within the third frequency range, the operations may include determining one or more electrical components configured to receive power associated with the detected sound. In addition to the output signal indicating the type of error and the one or more operational metrics, the output signal may also indicate the determined one or more electrical components.

Referring to FIG. 1, in some embodiments, one or more of the actuators 110, the encoders 114, the control system 116, the sensors 118, and the communication system 120 may be configured to work in an interconnected fashion with other components within and/or outside their respective systems. Further, the robotic device 100 may include one or more elements in addition to or instead of those shown. For example, the robotic device 100 may include one or more additional interfaces and/or power supplies. Other additional components are possible as well. In such embodiments, the data storage 172 may further include instructions (e.g., instructions 174, etc.) executable by the processor 170 to control and/or communicate with the additional components.

Still further, while each of the components and systems are shown to be integrated in the robotic device 100, in some embodiments, one or more components or systems may be removably mounted to or otherwise connected (e.g., mechanically or electrically) to the robotic device 100 using wired or wireless connections. The robotic device 100 may take other forms as well. Further, in some embodiments, the robotic device 100 may include more, fewer, or different components than those shown in FIG. 1.

Figure 2:
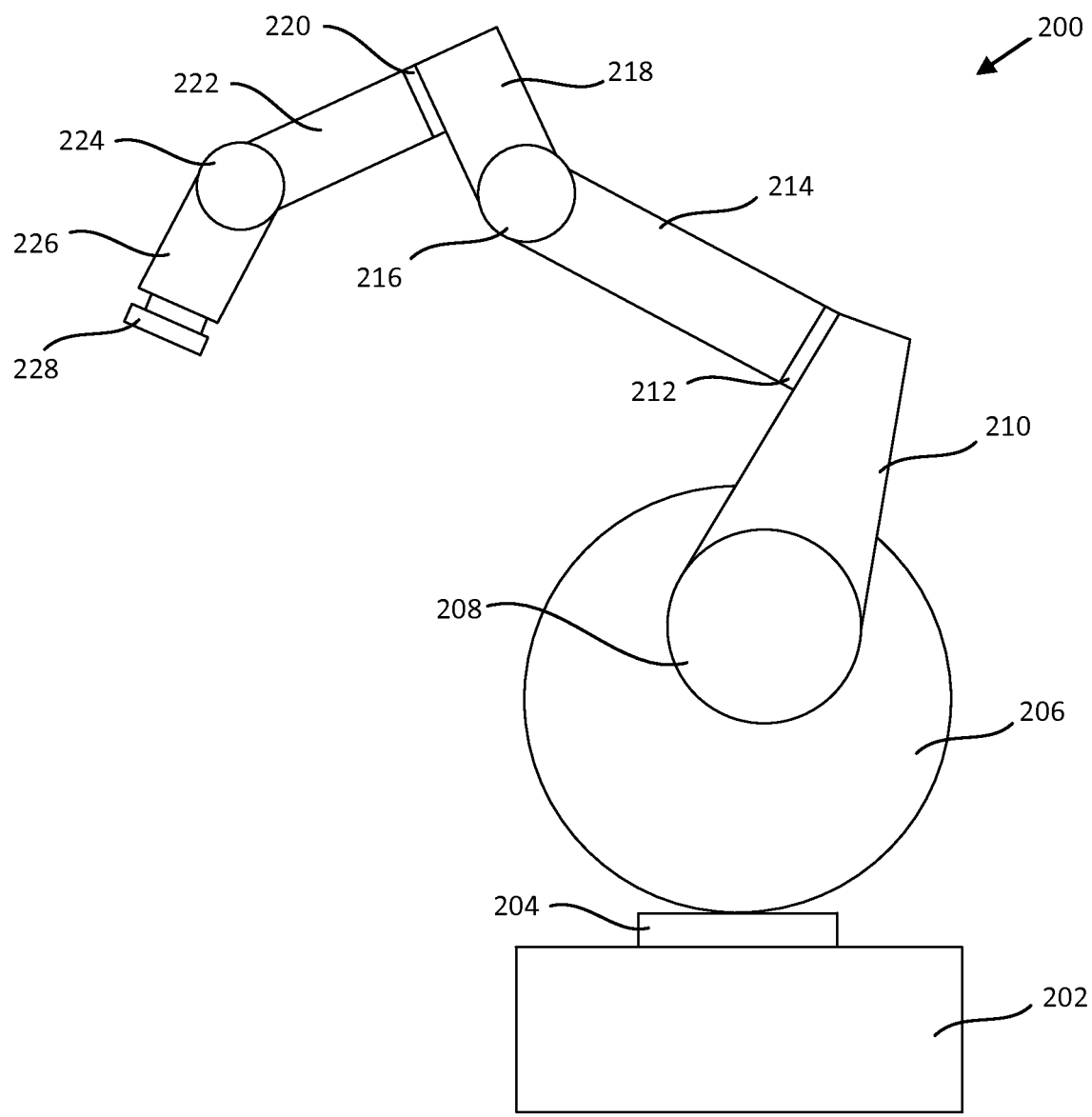
FIG. 2 illustrates a robotic device, according to an example embodiment.

FIG. 2 illustrates an example robotic device 200. The robotic device 200 may contain hardware, such as a processor, one or more computing devices, memory or storage, and sensors that enable the robotic device 200 to operate the robotic device 200 for use in assembly operations, pick and place work, spot welding, etc. The robotic device 200 may be powered by various means such as electric motors, pneumatic motors, hydraulic motors, etc. The robotic device 200 includes a base 202, links 206, 210, 214, 218, 222, and 226, joints 204, 208, 212, 216, 220, and 224, and manipulator 228.

The base 202 may provide a platform in order to provide support for the robotic device 200. The base 202 may be stationary or be coupled to wheels in order to provide movement of the robotic device 200. The base may comprise any number of materials such as aluminum, steel, stainless steel, etc., that may be suitable for a given environment associated with the robotic device 200.

The links 206, 210, 214, 218, 222, and 226 may be configured to be moved according to a programmable set of instructions. For instance, the links may be configured to follow a predetermined set of movements in order to accomplish a repetitive task over a period of time. By way of example, the links 206, 210, 214, 218, 222, and 226 may form a kinematic chain that defines relative movement of a given link of links 206, 210, 214, 218, 222, and 226 at a given joint of the joints 204, 208, 212, 216, 220, and 224.

The joints 204, 208, 212, 216, 220, and 224 may be configured to rotate through the use of a mechanical gear system. In one example, the mechanical gear system may be driven by a strain wave gearing, a cycloid drive, etc. The mechanical gear system selected would depend on a number of factors related to the operation of the robotic device 200 such as the length of the given link of the links 206, 210, 214, 218, 222, and 226, speed of rotation, desired gear reduction, etc. Providing power to the joints 204, 208, 212, 216, 220, and 224 will allow for the links 206, 210, 214, 218, 222, and 226 to be moved in a way that allows the manipulator 228 to interact with an environment.

In another example, the robotic device 200 may be configured to perform a predetermined motion according to a motion plan that results in link 222 rotating and link 206 remaining stationary. In the event that an unexpected external torque is applied to link 206 and thereby causing link 206 to move, then torque and velocity sensors will detect a power associated with the mechanical link and current and voltage sensors will detect a power associated with the electrical power generated from the motor. Based on signs of these detected powers, a given detector may provide information indicative of the possible state of operation associated with link 206 to one or more computing devices. In this example, based on a determination of an unexpected operation of the robotic device 200, the one or more computing devices may be configured to disable the electrical input associated with the robotic device 200.

The manipulator 228 may be configured to allow the robotic device 200 to interact the environment as shown in FIG. 2. In one example, the manipulator 228 may perform appropriate placement of an element through various operations such as lifting, maneuvering, and gripping etc. By way of example, the manipulator may be exchanged for another end effector that would provide the robotic device 200 with different functionality.

The robotic device 200 may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications.

Figure 3:
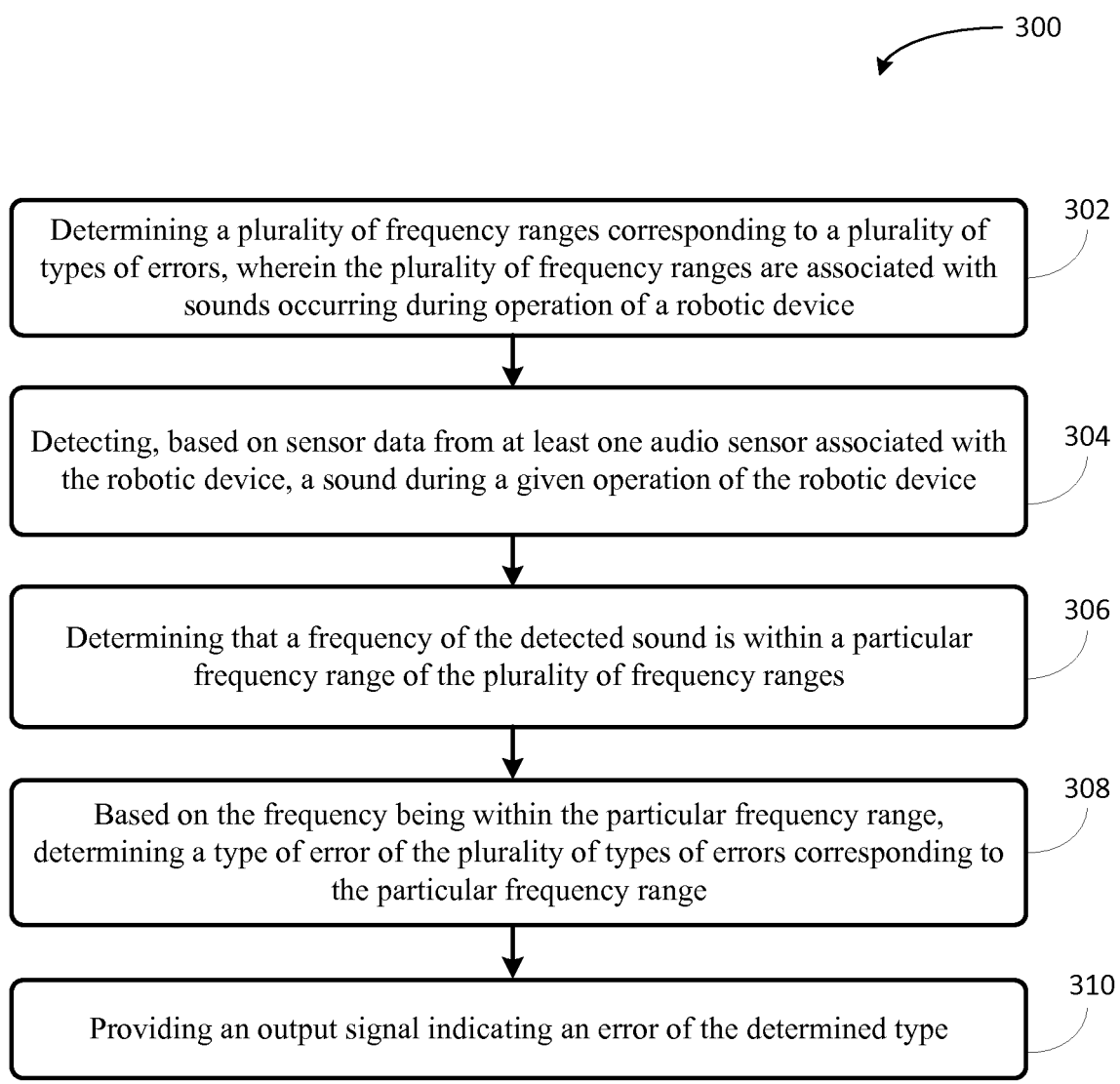
FIG. 3 is a block diagram of an example method for determining a type of error based on detection of a sound during operation of a robotic device, according to an example embodiment.

FIG. 3 is a block diagram of an example method for determining a type of error based on detection of a sound during operation of a robotic device, in accordance with at least some embodiments described herein. Method 300 may include one more operations, functions, or actions as illustrated by one or more of blocks 302-310. Although the blocks are illustrated in a sequential order, these blocks may in some instances be performed in parallel, and/or in a different order than those described therein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process. Illustrative methods, such as method 300, may be carried out in whole or in part by a component or components in the cloud and/or a robotic system, such as by the one or more of the components of the robotic device 100 shown in FIG. 1. However, it should be understood that example methods, such as method 300, may be carried out by other entities or combinations of entities (i.e., by other computing devices and/or combinations of computing devices), without departing from the scope of the invention.

For example, functions of the method 300 may be fully performed by a computing device (or components of a computing device such as one or more processors), or may be distributed across multiple components of the computing device, across multiple computing devices, and/or across a server. In some examples, the computing device may receive information from sensors of the robotic device, or where the computing device is a server the information can be received from another device that collects the information. As other examples, the method 300 may be performed by a computing device, by a server, or by a robotic device.

As shown by block 302, method 300 includes determining a plurality of frequency ranges corresponding to a plurality of types of errors, where the plurality of frequency ranges are associated with sounds occurring during operation of a robotic device. In one scenario, the plurality of types of errors may be mechanical errors, software errors, and electrical errors. In one embodiment, the plurality of frequency ranges may vary according to a specific configuration of components of the robotic device. For instance, a robotic device that uses a belt transmission may have mechanical errors that correspond to a different frequency range than a robotic device that uses mechanical gears or that uses a cycloid drive.

In another embodiment, the plurality of frequency ranges may include a first frequency range corresponding to the mechanical errors, a second frequency range corresponding to the software errors, and a third frequency range corresponding to the electrical errors. In this embodiment, the third frequency range includes higher frequencies than frequencies within the second frequency range, and wherein the second frequency range includes higher frequencies than frequencies within the first frequency range.

Figure 4:
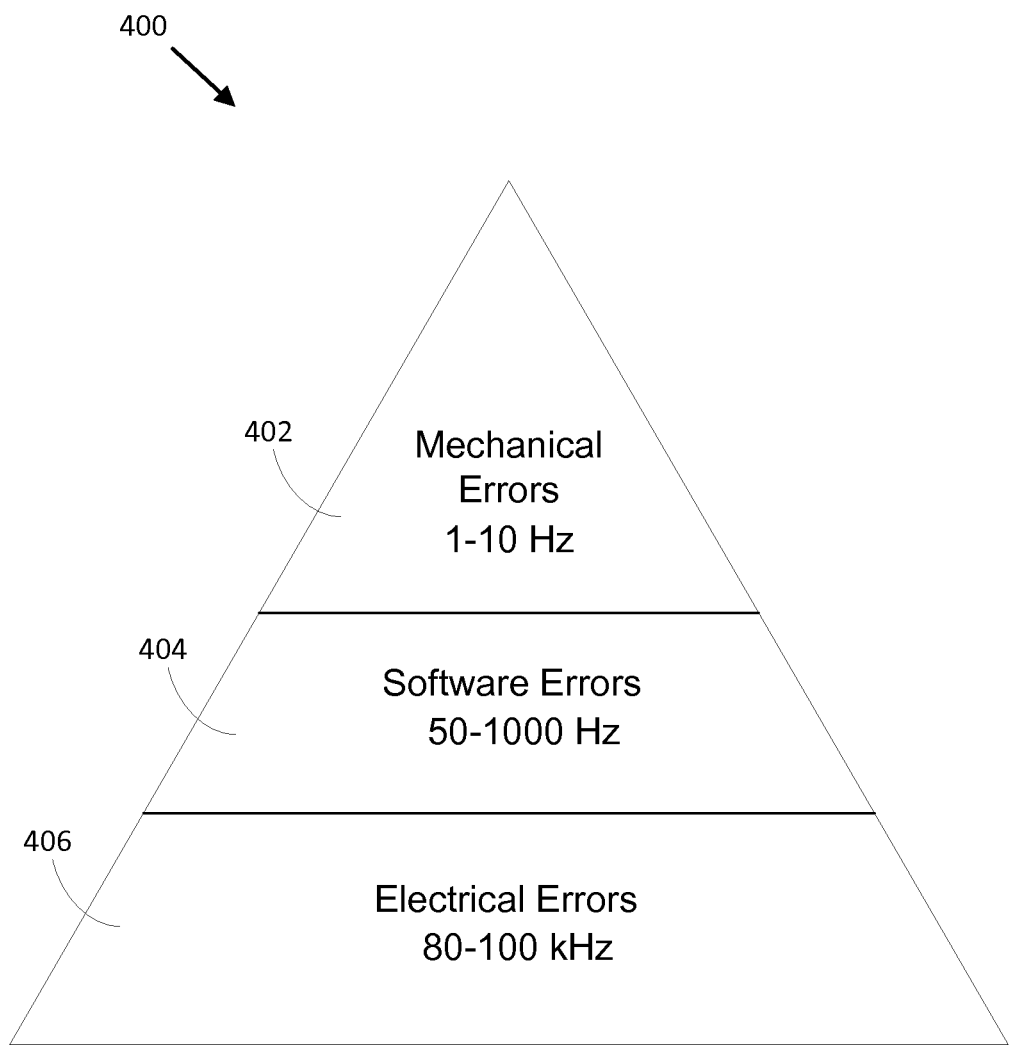
FIG. 4 is a diagram illustrating a plurality of frequency ranges that correspond to a plurality of types of errors, according to an example embodiment.

FIG. 4 is an example diagram 400 illustrating a plurality of frequency ranges that correspond to a plurality of types of errors. As shown in FIG. 4, a first frequency range 402 of 1 to 10 Hz may correspond to mechanical errors, a second frequency range 404 of 50 to 1000 Hz may correspond to software errors, and a third frequency range 406 of 80 to 100 kHz may correspond to electrical errors. In this example, the frequency ranges associated with each type of error may be determined to not overlap. By having distinct frequency ranges associated with each type of error, the frequency of a detected sound may be assigned to a given frequency range in order to determine the type of error associated with the detected sound.

In further examples, certain frequency ranges may be identified for which errors may be likely to come from multiple different sources. For instance, in reference to FIG. 4, a mixed range between 1 kHz and 80 kHz may be identified for which the cause of a sound may be likely to be either a software error or an electrical error. Additionally, the ranges of frequencies corresponding to different types of errors may not be absolute ranges, and may depend on the types of hardware used by a particular robot.

Referring back to FIG. 3, in other examples, as shown by block 304, method 300 includes detecting, based on sensor data from at least one audio sensor associated with the robotic device, a sound during a given operation of the robotic device. In one scenario, an audio sensor associated with the robotic device 200 may detect a sound based on movement of link 226 through the use of joint 224. In this scenario, the sensor data of the detected sound may be transmitted by the communication system 120 of robotic device 100 to a remote server for further processing. By way of example, the remote server may be configured to aggregate the sensor data of one or more robotic devices in order to build a database of frequencies associated with the various error types.

Figure 5:
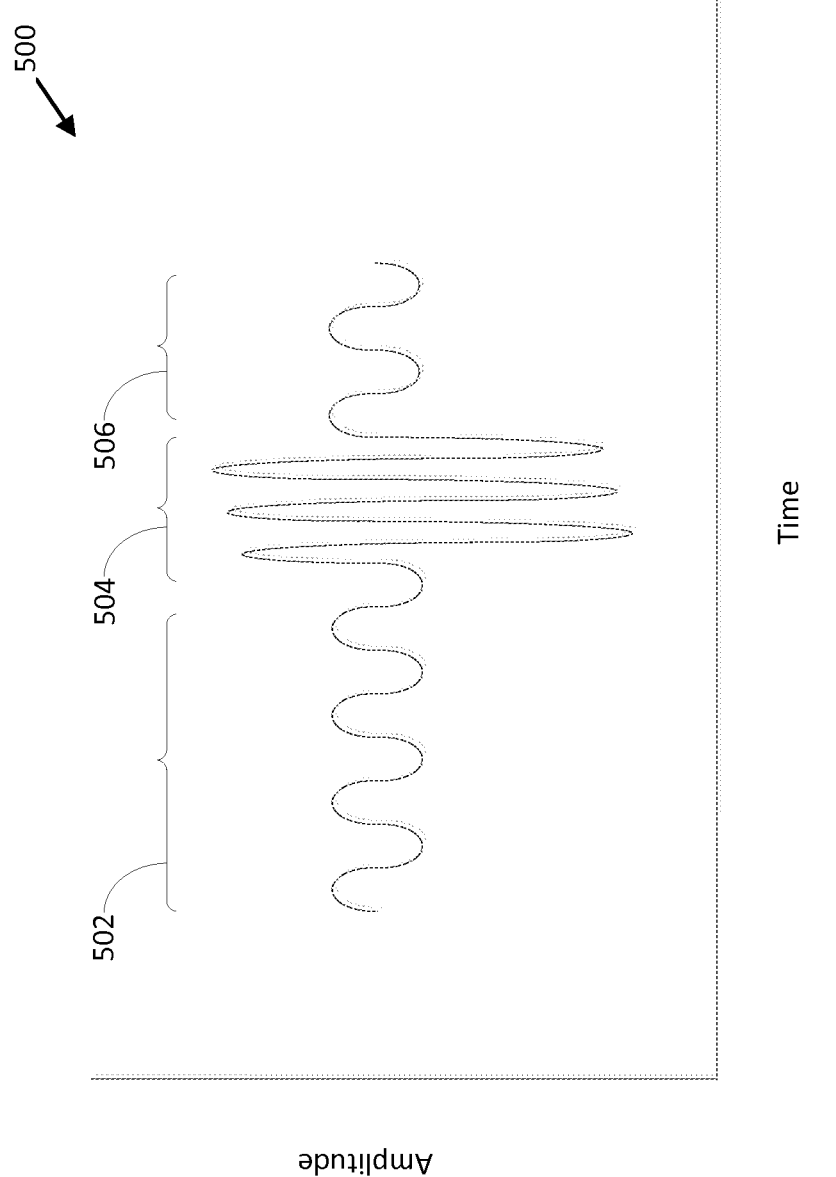
FIG. 5 is an example portion of sensor data detected by an audio sensor associated with a robotic device, according to an example embodiment.

FIG. 5 is an example portion of sensor data 500 detected by at least one audio sensor during a given operation of the robotic device. As shown in FIG. 5, the sensor data 500 may be divided into a first period of time 502, a second period of time 504, and a third period of time 506. The first period of time 502 may include sensor data that corresponds to sounds associated with normal operation of the robotic device during the given operation.

By way of example, an unexpected error may occur during the second period of time 504. The unexpected error may cause a sound associated with a different frequency than a sound within the first period of time 502. As shown in FIG. 5, the sensor data within the second period of time 504 may also contain a higher amplitude than the sound within the first period of time 502. As the robotic device progresses through the given operation, the frequency range of sounds in the third period of time 506 may once again correlate to the frequency range of sounds within the first period of time 502 based on normal operation.

Referring back to FIG. 3, as shown by block 306, method 300 includes determining that a frequency of the detected sound is within a particular frequency range of the plurality of frequency ranges. By way of example, the detected sound may correspond to a frequency of 600 Hz. In this example, according to FIG. 4, a frequency of 600 Hz would fall within the particular frequency range corresponding to software errors.

As shown by block 308, based on the frequency being within the particular frequency range, the method 300 includes determining a type of error of the plurality of types of errors corresponding to the particular frequency range. In one instance, the type of error may be selected from software errors. In this instance, the software errors may include one or more errors associated with position control, velocity control, or current control. By way of example, an error associated with position control may allow the robotic device to complete the given operation but still produce a detectable sound by the microphone. By determining the type of error associated with the detected sound, an individual may adjust one or more commands associated with position control in order to improve the performance of the robotic device.

As shown by block 310, method 300 includes providing an output signal indicating an error of the determined type. The output signal may be used to begin identifying what may be causing the error of the determined type. For instance, if the error of the determined type is associated with electrical errors, then one or more electrical components of the robotic device may be analyzed to determine if any replacements of the one or more electrical components are needed.

In some examples, in addition to the error of the determined type, the output signal may also indicate the determined operational data. For example, the method 300 may further include determining a duration of the detected sound. In this example, based on the duration, the method may also include determining operational data associated with the given operation of the robotic device. Within examples, the operational data may include position, torque, velocity, current, and/or voltage associated with the robotic device. The operational data, as mentioned above, may be timestamped with the same clock in order to correlate it with the detected sound. In an example system, the operational data may always be streamed to a particular location and stored locally in a circular buffer (e.g., storing 5 minutes worth of operational data). When a sound is detected indicating an error, the sound may then trigger storage of the buffer of timestamped data. Such a method may prevent unnecessary storage of operational data that is considered to be correct based on detected sounds.

In one scenario, the duration of the detected sound may correspond to a duration of movement of joint 204 of robotic device 200. In this example, a start position and an end position of joint 204 may be included in the output signal and reviewed to determine if there are any issues associated with the given operation.

In another scenario, the output signal may also indicate a list of several possible types of errors with corresponding probabilities. Associating a probability with a type of error may help to reduce the time spent determining what is causing the robotic device to not operate properly. In one example, based on an aggregation of data associated with the detected sounds, several types of errors may be weighted in order to provide a higher confidence in the output signal.

By way of example, a probabilistic model may be used to determine the weight of the one or more types of errors. The probabilistic model may be used to analyze additional data associated with the robotic device. For example, the probabilistic model may take into consideration various operating conditions such as how long the robotic device has been operating in addition to multiple temperature readings to help determine the most likely type of error. Other models may also be used to determine which error is most likely occurring.

As an example, in reference to FIG. 4, the second frequency range 404 of 50 Hz to 1000 Hz may be determined to correspond to software errors, but a certain percentage of the time, sounds within the frequency range 404 may actually correspond to different types of errors. For instance, an error which produces a sound with a frequency of 500 Hz may be generated by software, but the actual cause of the problem may have been a failure of a sensor. After analyzing control data associated with the sound, the problem may therefore ultimately be identified as an electrical problem. A probabilistic model may be determined to account for this type of situation.

As another example, even though the first frequency range 402 of 1 to 10 Hz may be determined to correspond to mechanical errors, a detected sound with a frequency between 1 Hz and 10 Hz could result from a software error, but the system may be very unlikely to encounter such a software error. In such an instance, the probabilistic model may indicate that there is a very high probability (e.g., over 99%) that the detected sound indicates a hardware error, even though the model is not fully deterministic.

In additional examples, a model may be determined that correlates different types of sensor errors with different sound frequencies. In particular, from a controls perspective, a robotic system will have a transfer function from sensor input to motor output, which has its own natural frequencies. Accordingly, by using these output frequencies, the methodology described herein could also be used to identify sound frequencies associated with types of sensor failures.

In another instance, the method 300 may further include determining a direction associated with the detected sound. In this instance, based on the determined direction and the determined type of errors, the method 300 may include determining one or more components of the robotic device associated with the detected sound. In one scenario, in addition to the error of the determined type, the output signal may also indicate the determined one or more components.

Figure 6:
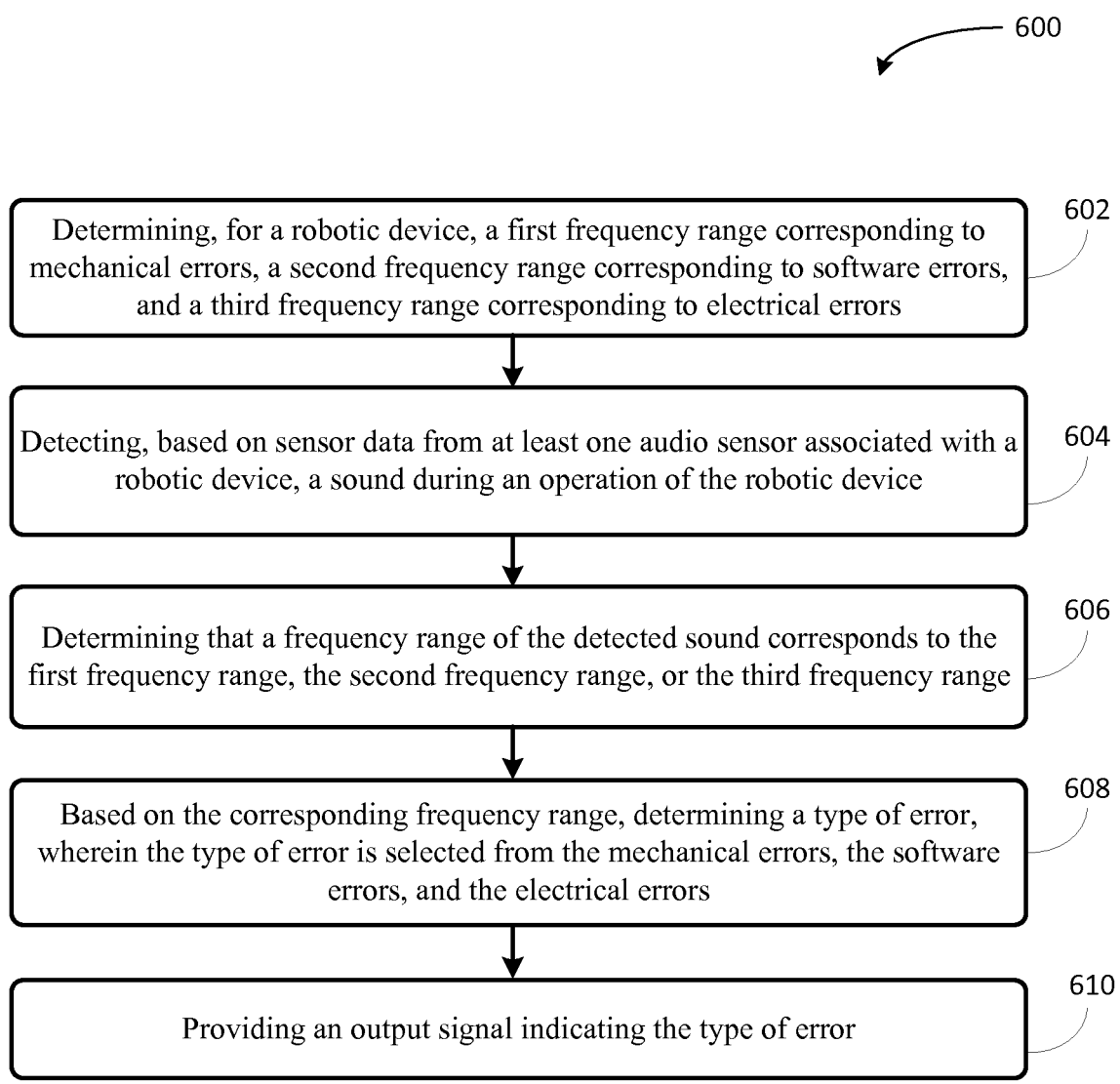
FIG. 6 is a block diagram of another example method for determining a type of error based on detection of a sound during operation of a robotic device, according to an example embodiment.

FIG. 6 is a block diagram of another example method for determining a type of error based on detection of a sound during operation of a robotic device, in accordance with at least some embodiments described herein. Method 600 may include one more operations, functions, or actions as illustrated by one or more of blocks 602-610. Although the blocks are illustrated in a sequential order, these blocks may in some instances be performed in parallel, and/or in a different order than those described therein. Also, the various blocks may be combined into fewer blocks, divided into additional blocks, and/or removed based upon the desired implementation.

In some examples, a detected sound may correspond to a particular frequency and therefore method 300 may be used to determine the type of error based on the particular frequency. In other examples, a detected sound may correspond to particular frequency range. Method 600 is directed towards determining the type of error based on a frequency range of a detected sound. For instance, a detected sound may produce sound within a frequency range (i.e., 400 Hz to 425 Hz) as opposed to one particular frequency (i.e., 415 Hz).

As shown by block 602, method 600 includes determining, for a robotic device, a first frequency range corresponding to mechanical errors, a second frequency range corresponding to software errors, and a third frequency range corresponding to electrical errors. In one embodiment, the second frequency range may vary according to a specific configuration of components of the robotic device. By way of example, the first frequency range, the second frequency range, and the third frequency range may correspond to the frequency ranges shown in FIG. 4.

As shown by block 604, method 600 includes detecting, based on sensor data from at least one audio sensor associated with a robotic device, a sound during an operation of the robotic device. By way of example, the sounds detected during the operation of the robotic device may exhibit different durations. For instance, a jerk in movement based on a software error may produce a sound with a shorter duration than a circuit failing which may produce a buzzing sound that lasts longer in duration.

As shown by block 606, method 600 includes determining that a frequency range of the detected sound corresponds to the first frequency range, the second frequency range, or the third frequency range. In one example, the frequency range of the detected sound may correspond to first frequency range by falling entirely within the first frequency range. For instance, a continuous sound may be detected based on a belt of the robotic device starting to fail and may correspond to a frequency range of 4 to 5 Hz. In this instance, based on the first frequency range being from 1 to 10 Hz, the determined frequency range of the detected sound would fall entirely within the first range.

As shown by block 608, based on the corresponding frequency range, the method 600 includes determining a type of error, wherein the type of error is selected from the mechanical errors, the software errors, and the electrical errors. For example, based on the frequency range (i.e., 95 to 97 kHz) of the detected sound corresponding to the third frequency range (i.e., 80-100 kHz), the determined type of error may be an electrical error. In another instance, the detected sound may produce a frequency range of 40 to 55 Hz and thereby partially overlap with the second frequency range of 50 to 1000 Hz. In this instance, the determined type of error may correspond to a software error due to the partial overlap between the frequency range of the detected sound and the second frequency range.

As shown by block 610, method 600 includes providing an output signal indicating the type of error. The output signal may also provide additional information that may be useful in identifying what may be causing the error. For instance, the method 600 may include determining a duration of the detected sound. An individual may use the duration of the detected sound to eliminate possible errors associated with one or more components based on a specific configuration of the robotic device. In this example, the output signal may indicate the determined duration.

In another example, the method 600 may determine that an error has occurred based on the amplitude of the detected sound. In one scenario, if the amplitude of the detected sound exceeds a sound threshold of 10 decibels, then method 600 may determine that an error has occurred during the operation of the robotic device. For example, the method 600 may include determining an amplitude (i.e., 15 dB) of the detected sound and determining an error associated with the operation of the robotic device based on the determined amplitude exceeding a sound threshold (10 dB) associated with the operation.

In one instance, the method 600 may further include determining an application state associated with the detected sound, wherein the application state comprises control information associated with a given operation. By way of example, the control information may include one or more commands associated with at least one of position control, velocity control, and current control. In this instance, in addition to the error of the determined type, the output signal may also indicate the determined application state.

In another instance, the method 600 may further include determining a start time of the detected sound. Based on the start time, the method 600 may include determining a location in a sequence of program instructions corresponding to the given operation. In this instance, in addition to the error of the determined type, the output signal may also indicate the determined location.

The determined location in the sequence of program instructions may be helpful when attempting to determine what may be causing a problem during continuous integration testing. In one embodiment, the detected sound may be a first detected sound and the method 600 may include starting actuation of the robotic device based on the determined location in the sequence of program instructions. In this embodiment, the method 600 may include detecting, based on additional sensor data from at least one audio sensor of the robotic device, a second sound during actuation of the robotic device. The method 600 may include determining a correlation between the first detected sound and the second detected sound. In one example, the correlation may be based on a percentage of overlap of the frequency range of the first detected sound and the frequency range of the second detected sound. For instance, the frequency range of the first detected sound may be 5 to 6.6 Hz and the frequency range of the second detected sound may be 4.8 to 6.4 Hz. In this instance, based on more than an 85 percent correlation due to the overlap of frequency ranges, a threshold of more than 75 percent may be satisfied. Based on the correlation satisfying a threshold, the method 600 may include providing information indicative of the correlation.

Figure 7:
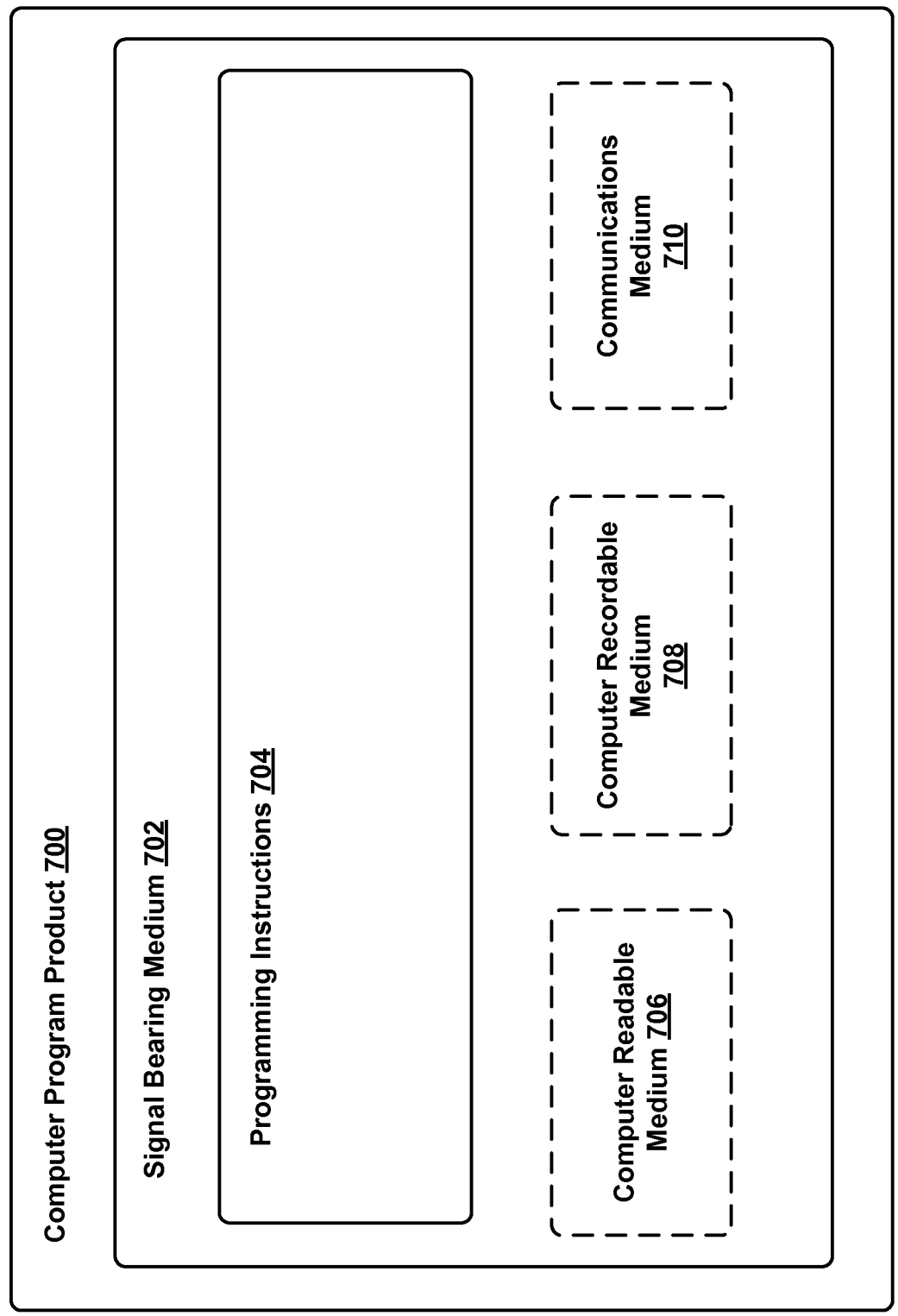
FIG. 7 depicts an example computer readable medium configured according to an example embodiment.

FIG. 7 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., functions of the robotic device 100, robotic device 200, method 300, method 600, etc.) may be implemented by computer program instructions encoded on a computer readable storage media in a machine-readable format, or on other media or articles of manufacture. FIG. 7 is a schematic illustrating a conceptual partial view of an example computer program product that includes a computer program for executing a computer process on a computing device, arranged according to at least some embodiments disclosed herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may be a computer-readable medium 706, such as, but not limited to, a hard disk drive, a Compact Disc (CD), a Digital Video Disk (DVD), a digital tape, memory, etc. In some implementations, the signal bearing medium 502 may be a computer recordable medium 708, such as, but not limited to, memory, read/write (R/W) CDs, R/W DVDs, etc. In some implementations, the signal bearing medium 702 may be a communication medium 710 (e.g., a fiber optic cable, a waveguide, a wired communications link, etc.). Thus, for example, the signal bearing medium 702 may be conveyed by a wireless form of the communications medium 710.

The one or more programming instructions 704 may be, for example, computer executable and/or logic implemented instructions. In some examples, a computing device may be configured to provide various operations, functions, or actions in response to the programming instructions 704 conveyed to the computing device by one or more of the computer readable medium 706, the computer recordable medium 708, and/or the communications medium 710.

The computer readable medium 706 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   obtaining, by a control system of a robotic device that comprises (i) an arm having an end effector and (ii) an actuator configured to actuate the arm along one or more motion paths to cause the end effector to interact with an environment, a plurality of frequency ranges corresponding to a plurality of types of errors, wherein the plurality of frequency ranges are associated with sounds occurring during operation of the robotic device;
   detecting, by the control system and based on sensor data from at least one audio sensor associated with the robotic device, a first sound during actuation of the arm along a particular motion path to perform a given operation of the robotic device;
   determining, by the control system, (i) a start time of the first sound and (ii) a start position of the robotic device at the start time of the first sound;
   determining, by the control system, that a frequency of the first sound is within a particular frequency range of the plurality of frequency ranges;
   based on the frequency being within the particular frequency range, determining, by the control system, a type of error of the plurality of types of errors corresponding to the particular frequency range;
   based on the start time, determining, by the control system, a location in a sequence of program instructions corresponding to the given operation; and
   causing, as part of execution of an error testing procedure by the control system, the robotic device to repeat at least a portion of the given operation by moving the arm to the start position and starting actuation of the arm from the determined location in the sequence of program instructions, wherein the execution of the error testing procedure further comprises: (i) detecting, based on additional sensor data from the at least one audio sensor, a second sound occurring while repeating at least the portion of the given operation, (ii) determining a correlation between the first sound and the second sound, and (iii) providing, by the control system, an output signal indicating the type of error and information indicative of the correlation.

2. The method of claim 1, wherein the plurality of types of errors comprise motion control errors and component failure errors.

3. The method of claim 2, wherein the plurality of frequency ranges comprise a first frequency range corresponding to mechanical component failure errors, a second frequency range corresponding to the motion control errors, and a third frequency range corresponding to electrical component failure errors.

4. The method of claim 3, wherein the third frequency range comprises higher frequencies than frequencies within the second frequency range, and wherein the second frequency range comprises higher frequencies than frequencies within the first frequency range.

5. The method of claim 2, wherein the motion control errors comprise at least one of (i) errors associated with position control of the robotic device, (ii) errors associated with velocity control of the robotic device, or (iii) errors associated with current control of the robotic device.

6. The method of claim 1, further comprising:
   determining a duration of the first sound; and
   based on the duration, determining operational data associated with the given operation of the robotic device, wherein the output signal also indicates the determined operational data.

7. The method of claim 1, further comprising:
   based on the frequency of the first sound being within the particular frequency range, determining one or more candidate types of errors of the plurality of types of errors corresponding to the particular frequency range;
   for each respective error of the one or more candidate types of errors, determining a probability of the respective error occurring based on operating conditions of the robotic device; and
   based on the probability determined for each respective error, determining the type of error corresponding to the first sound, wherein the output signal also indicates the one or more candidate types of errors and, for each respective error, the probability of the respective error occurring.

8. The method of claim 1, further comprising:
   determining an amplitude of the first sound; and
   based on the determined amplitude exceeding a sound threshold associated with the given operation, determining the type of error, wherein the output signal also indicates the determined amplitude.

9. A method comprising:
obtaining, by a control system of a robotic device that comprises (i) an arm having an end effector and (ii) an actuator configured to actuate the arm along one or more motion paths to cause the end effector to interact with an environment, a first frequency range corresponding to mechanical component failure errors, a second frequency range corresponding to motion control errors, and a third frequency range corresponding to electrical component failure errors;
detecting, by the control system and based on sensor data from at least one audio sensor associated with the robotic device, a first sound during actuation of the arm along a particular motion path to perform an operation of the robotic device;
determining, by the control system, (i) a start time of the first sound and (ii) a start position of the robotic device at the start time of the first sound;
determining, by the control system, that a frequency range of the first sound corresponds to the first frequency range, the second frequency range, or the third frequency range;
based on the frequency range corresponding to the first frequency range, the second frequency range, or the third frequency range, determining, by the control system, a type of error, wherein the type of error is selected from the mechanical component failure errors, the motion control errors, and the electrical component failure errors;
based on the start time, determining, by the control system, a location in a sequence of program instructions corresponding to the operation; and
causing, as part of execution of an error testing procedure by the control system, the robotic device to repeat at least a portion of the operation by moving the arm to the start position and starting actuation of the arm from the determined location in the sequence of program instructions, wherein the execution of the error testing procedure further comprises: (i) detecting, based on additional sensor data from the at least one audio sensor, a second sound occurring while repeating at least the portion of the operation, (ii) determining a correlation between the first sound and the second sound, and (iii) providing, by the control system, an output signal indicating the type of error and information indicative of the correlation.

10. The method of claim 9, further comprising:
determining an application state associated with the first sound, wherein the application state comprises motion control information associated with the operation, wherein the output signal also indicates the determined application state.

11. The method of claim 10, wherein the motion control information comprises one or more commands associated with at least one of position control, velocity control, or current control.

12. The method of claim 9, further comprising:
determining a duration of the first sound, wherein the output signal also indicates the determined duration.

13. The method of claim 9, further comprising:
determining an amplitude of the first sound; and
based on the determined amplitude exceeding a sound threshold associated with the operation, determining the type of error associated with the operation of the robotic device, wherein the output signal also indicates the determined amplitude.

14. The method of claim 9, wherein determining the type of error comprises:
for each respective error of the mechanical component failure errors, the motion control errors, and the electrical component failure errors, determining a probability of the respective error occurring based on operating conditions of the robotic device; and
determining the type of error based on the probability determined for each respective error, wherein the output signal also indicates, for each respective error, the probability of the respective error occurring.

15. A robotic device comprising:
an arm having an end effector;
an actuator configured to actuate the arm along one or more motion paths to cause the end effector to interact with an environment;
one or more audio sensors, wherein the one or more audio sensors are configured for detecting a sound associated with operation of the robotic device; and
data storage comprising instructions executable by one or more processors to cause the robotic device to perform functions comprising:
obtaining a first frequency range corresponding to mechanical component failure errors, a second frequency range corresponding to motion control errors, and a third frequency range corresponding to electrical component failure errors;
detecting, based on sensor data from the one or more audio sensors, a first sound during actuation of the arm along a particular motion path to perform the operation of the robotic device;
determining (i) a start time of the first sound and (ii) a start position of the robotic device at the start time of the first sound;
determining that a frequency of the first sound is within a particular frequency range of the first frequency range, the second frequency range, or the third frequency range;
based on the frequency of the first sound being within the particular frequency range of the first frequency range, the second frequency range, or the third frequency range, determining a type of error associated with the particular frequency range;
based on the start time, determining a location in a sequence of program instructions corresponding to the operation; and
causing, as part of execution of an error testing procedure by the one or more processors, the robotic device to repeat at least a portion of the operation by moving the arm to the start position and starting actuation of the arm from the determined location in the sequence of program instructions, wherein the execution of the error testing procedure further comprises: (i) detecting, based on additional sensor data from the one or more audio sensors, a second sound occurring while repeating at least the portion of the operation, (ii) determining a correlation between the first sound and the second sound, and (iii) providing an output signal indicating the type of error and information indicative of the correlation.

16. The robotic device of claim 15, the functions further comprising:
determining that the frequency is within the first frequency range;
determining a duration associated with the first sound; and
based on the frequency being within the first frequency range and the determined duration, identifying one or more components of the robotic device configured for movement and associated with the first sound, wherein the output signal also indicates the identified one or more components.

17. The robotic device of claim 15, the functions further comprising:
    determining that the frequency is within the second frequency range; and
    based on the frequency being within the second frequency range, determining an application state associated with the first sound, wherein the application state comprises one or more values stored in a memory and the determined location in the sequence of program instructions, wherein the output signal also indicates the determined application state.

18. The robotic device of claim 15, the functions further comprising:
    determining that the frequency is within the third frequency range; and
    based on the frequency being within the third frequency range, determining one or more electrical components configured to receive power and associated with the first sound, wherein the output signal also indicates the determined one or more electrical components.

19. The robotic device of claim 15, the functions further comprising:
    determining one or more operational data associated with the robotic device when the first sound was detected, wherein the one or more operational data are determined according to a first period of time prior to the first sound and a second period of time subsequent to the first sound.

20. The robotic device of claim 15, wherein the motion control errors comprise at least one of (i) errors associated with position control of the robotic device, (ii) errors associated with velocity control of the robotic device, or (iii) errors associated with torque control of the robotic device.

* * * * *